United States Patent [19]

Perkins

[11] Patent Number: 4,662,912

[45] Date of Patent: May 5, 1987

[54] AIR PURIFYING AND STABILIZING BLOWER

[76] Inventor: Lynn W. Perkins, 8809 Glencraft Rd., Charlotte, N.C. 28212

[21] Appl. No.: 833,169

[22] Filed: Feb. 27, 1986

[51] Int. Cl.$^4$ .............................................. B01D 46/12
[52] U.S. Cl. ........................................ 55/316; 55/467; 98/31.5
[58] Field of Search ................. 55/316, 385 A, 385 B, 55/387, 467, 471; 98/31.5, 31.6, 40.12, 40.13

[56] References Cited

U.S. PATENT DOCUMENTS

| | | | |
|---|---|---|---|
| 2,313,676 | 3/1943 | Shaver | 55/471 |
| 2,363,839 | 11/1944 | Demuth | 98/31.5 |
| 2,808,237 | 10/1957 | Fornes | 98/31.5 X |
| 4,339,250 | 7/1982 | Thuy | 98/31.5 X |
| 4,526,592 | 7/1985 | Armbruster | 98/31.5 X |

FOREIGN PATENT DOCUMENTS

| | | | |
|---|---|---|---|
| 2717613 | 11/1977 | Fed. Rep. of Germany | 55/385 A |
| 3245769 | 8/1983 | Fed. Rep. of Germany | 55/385 A |
| 18642 | 9/1938 | Japan | 55/467 |

*Primary Examiner*—Harold Joyce
*Attorney, Agent, or Firm*—W. Thad Adams, III

[57] ABSTRACT

A blower (10) comprises a relatively large outer housing (16) positioned concentrically around and in spaced-apart relation to an inner housing (15). The space between the inner housing (15) and the outer housing (16) defines an air intake (25) which leads into an air intake chamber (26). A high efficiency carbon filter (22) and a fiberglass filter (23) are positioned together within air intake chamber (26) and filter air as it flows therethrough. After filtration, the air is directed by an impeller (30) within inner housing (15) downwardly through vanes (35).

7 Claims, 3 Drawing Figures

AIR PURIFYING AND STABILIZING BLOWER

TECHNICAL FIELD AND BACKGROUND OF THE INVENTION

This application relates to an air purifying and stabilizing blower. The blower is adapted to be mounted to a ceiling of a room to create a gentle circulation of air within the room to stabilize room temperature and to simultaneously remove particulate matter from the air. The air circulation feature of the invention is the subject of a prior patent by the same inventor, U.S. Pat. No. 4,473,000. In the U.S. Pat. No. 4,473,000, a blower is disclosed which includes a motor driven impeller mounted for rotation in a housing. The top portion of the housing has an air inlet and a cylindrical portion extending downwardly from the impeller to direct air downwardly into a room. Air directing vanes are fixed to the extended end of the housing and include a plurality of large vanes disposed in radial planes and extending along the entire length of the vane arrangement. In addition, a plurality of smaller radial vanes are provided adjacent the bottom portion of the larger vanes and are circumferentially offset so that as the air moves along the larger vanes it will, after some initial straightening, pass through the spacing between the larger vanes and the small vanes to impose a greater straightening effect on the air flow. The present invention incorporates an outer housing larger than the inner housing and positioned concentrically around the inner housing. As described below, the overall structure and operation of the device is substantially changed and permits the same efficient air circulation as provided by the earlier U.S. Pat. No. 4,473,000, while, at the same time, providing very efficient removal of both relatively large and small particulate matter without substantially impairing the air flow or substantially increasing power consumption. These efficiencies are achieved because of the construction of the blower which permits the air filter to accommodate a relatively large surface area, thereby permitting the filter to be thinner and less resistant to air flow.

SUMMARY OF THE INVENTION

Therefore, it is an object of the invention to provide an air purifying and stabilizing blower adapted to be mounted to the ceiling of a room to stabilize room temperature and to simultaneously remove particulate matter from the air.

It is another object of the invention to provide an air purifying and stabilizing blower which includes two filtration mats which permit the efficient removal of relatively large and relatively small particles in the air.

It is another object of the present invention to provide an air purifying and stabilizing blower which can be mounted above a dropped ceiling with the intake grill substantially flush therewith to permit quiet, unobtrusive air filtration and particulate matter removal.

These and other objects and advantages of the present invention are achieved by providing an inner housing in which a motor driven impeller is mounted for rotation to create an air flow. The inner housing includes an air inlet in the upper portion thereof for admitting air into the portion of the housing surrounding the impeller and air directing vanes fixed to and extending from the inner housing downstream from the impeller to direct air in a flow path extending generally parallel to the axis of rotation of the impeller through an air outlet into the room.

A relatively larger outer housing is positioned concentrically around and in spaced-apart relation to the inner housing. The space between the inner housing and the outer housing defines an air intake for directing air into an air intake chamber in fluid communication with the air inlet in the inner housing. A filter is positioned in the air intake chamber downstream from the air intake and upstream of the air inlet in the housing whereby air drawn into the inner housing for circulation back into the room is first filtered to remove particular matter.

Preferably, the filter comprises at least one air porous mat formed into a shape having a periphery generally corresponding to the shape defined by the inner walls of the outer housing. The mat also has a central aperture, the shape of which generally corresponds to the shape of the outer walls of the inner housing to fit snugly therearound.

Preferably, the upper portion of the inner housing has an enlarged diameter to form a shoulder and an area in the air intake chamber of reduced radial dimensions. The filter is supported against the shoulder mechanically and by air flow pressure through the air intake chamber.

According to the embodiment of the invention in this application, the filter comprises first and second air porous filtration mats, each of which are formed into a shape having a periphery generally corresponding to the shape defined by the inner walls of the outer housing. The mat has a central aperture, the shape of which generally corresponds to the shape of the outer walls of the inner housing to fit snugly therearound. The first filtration mat comprises a relatively air porous prefilter intended to remove relatively large size particulate matter. The second filtration mat comprises a relatively less air porous mat to trap particles of a relatively lesser size.

Preferably, the first filtration mat comprises a mat of glass fibers and the second filter mat comprises a mat of porous activated carbon.

BRIEF DESCRIPTION OF THE DRAWINGS

Some of the objects of the invention have been set forth above. Other objects and advantages of the invention will appear as the description of the invention proceed when taken in conjunction with the following drawings in which.

DESCRIPTION OF THE PREFERRED EMBODIMENT

Figure 1:
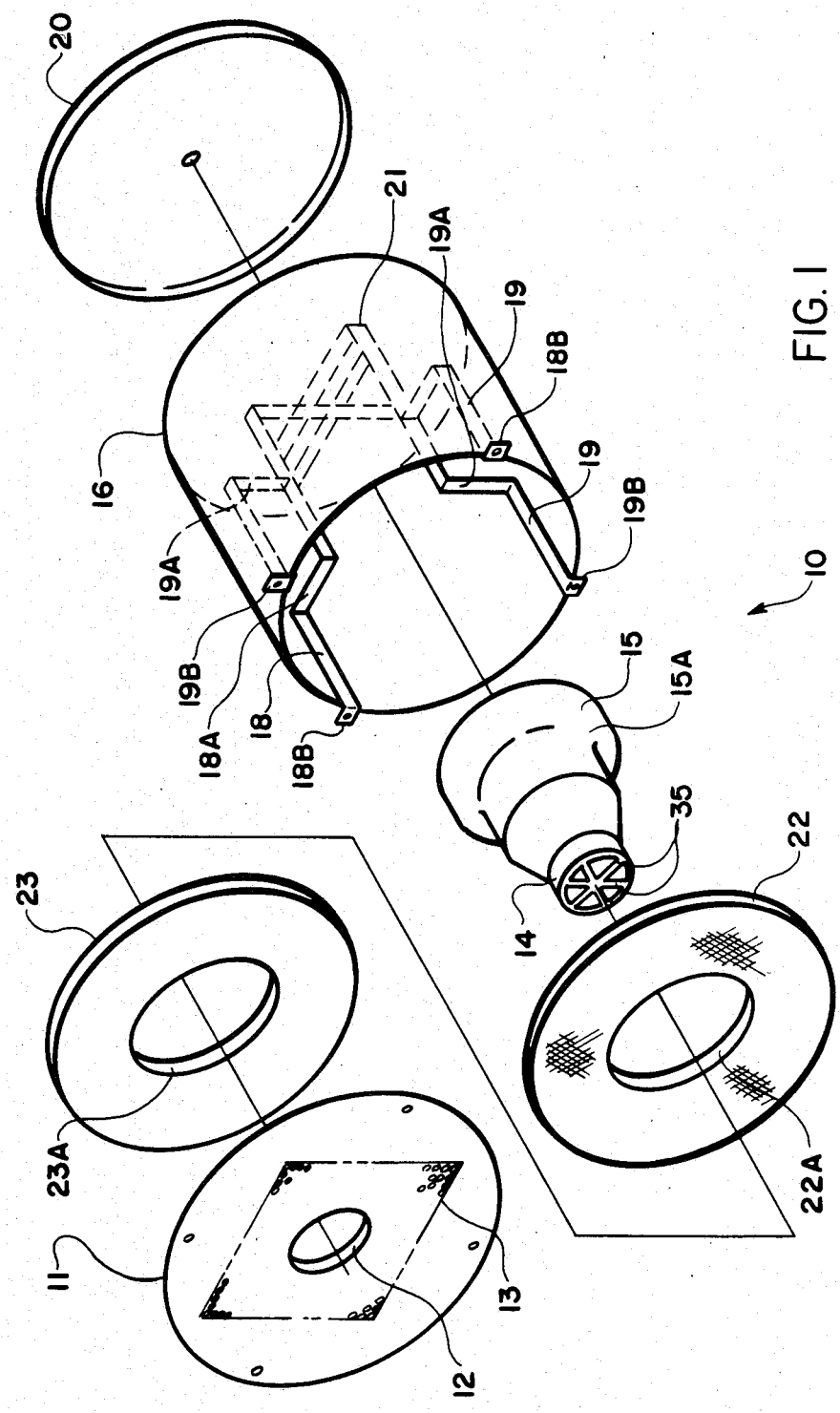
FIG. 1 is an exploded view of the blower.

Referring now specifically to the drawings, a blower according to the present invention is shown in exploded form and generally designated by reference numeral 10 in FIG. 1.

Blower 10 is preferably intended to be positioned above a dropped ceiling. Therefore, typically only the intake grill 11 having a centrally formed aperture 12 therein is seen. Intake grill 11 also includes a relatively large square defined by a multitude of relatively small holes 13 through which air is taken into the blower. Aperture 12 in intake grill 11 is of a suitable size to receive a downwardly extending air outlet 14 of an inner housing 15 which is described in further detail below with reference to FIG. 2. Inner housing 15 fits within and is suspended from the top of a cylindrical outer housing 16. Inner housing 15 is suspended within outer housing 16 by a pair of brackets 18 and 19. Brackets 18 and 19 are positioned in mutual right angle relation to each other and each have a step 18A, 19A, respectively. A cover plate 20 encloses the top of outer housing 16 to enclose the top of blower 10. Brackets 18 and 19 are suspended somewhat below the inner surface of cover plate 20 by means of a U-shaped bracket 21. A high efficiency carbon filter 22 and a fiberglass filter 23 are positioned together in outer housing 16 and rest against shoulders 18A, 19A in brackets 18 and 19. As is shown by continued reference to FIG. 1, filters 22 and 23 are each donut-shaped and define a centrally disposed aperture 22A, 23A, respectively, which fit snugly around the outer walls of inner housing 15 and against a shoulder 15A defined by a relatively large diameter, upper portion of inner housing 15.

Figure 2:
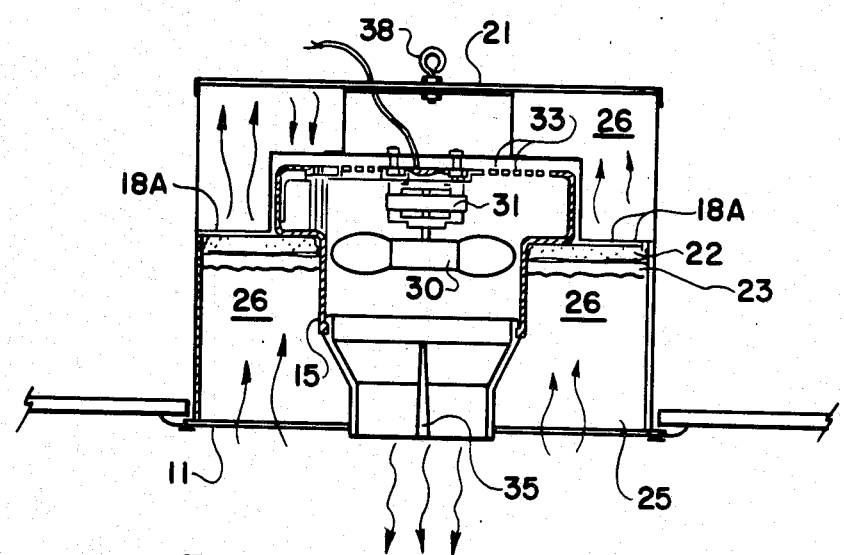
FIG. 2 is a vertical cross-section of the blower.

Referring now to FIG. 2, the area between the inner walls of outer housing 16 and the outer walls of inner housing 15 define an air intake 25 into an air intake chamber 26. Shoulders 18A and 19A (only 18A is shown) define, with the outer extending upper area of inner housing 15, a support against which filter mate 22 and 23 are positioned. Air flows through intake 25 into air intake chamber 26. The relatively large circumference of filters 22 and 23 provide a relatively large surface area through which air can pass during the filtration process.

Figure 3:
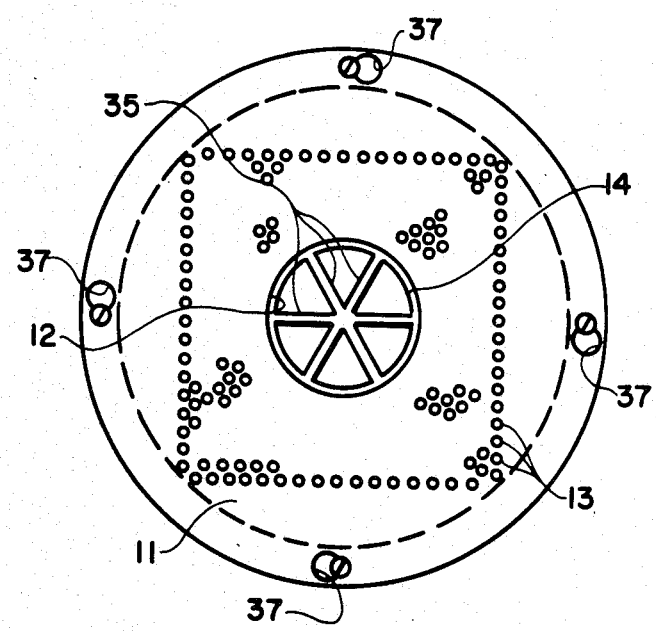
FIG. 3 is a bottom view of the blower.

An impeller 30 is mounted for rotation on a motor 31 within inner housing 15. Air flows from air intake chamber 26 through air inlets 33 in the upper portion of inner housing 15 under the impetus of impeller 30. Air is projected downwardly through inner housing 15 into an area of reduced diameter in which are positioned flow directing vanes 35. Intake grill 11 is secured to outer housing 16 by means of sheet metal screws though outwardly extending tabs 18B and 19B, respectively, on brackets 18 and 19. The entire unit is suspended from an upwardly spaced-apart ceiling by means of a suitable anchor 38. As is shown in FIG. 3, intake grill 11 is secured to bracket tabs 18B, 19B by keyhole slots 37.

Further details of the inner housing portion of blower 10 are set forth in more detail in U.S. Pat. No. 4,473,000, the contents of which are incorporated herein by reference.

The invention described above provides a compact, unobtrusive blower which both gently circulates air to maintain an even temperature within the room and, at the same time, provides efficient removal of particulate matter. In addition to the apparent benefits obtained by continuously removing particulate matter from the environment of the room, prefiltration of the air before passing through inlets 33 makes it practically unnecessary to clean the air inlets 33 and the impeller 30 since the air has already been filtered. Therefore, the operating efficiency of blower 10 is enhanced and periodic maintenance and cleaning of the blower 10 is substantially reduced, if not entirely eliminated.

The description of the filter mats 22 and 23 are preferred choices because of the filtration efficiency achieved. The carbon filter 22 can, for example, be a Tech-Aire-80 carbon filter. This filter is approximately one inch thick and is very efficient at trapping very small particles. The glass fiber prefilter filtration mat 23 can preferably be a Tech-Aire-BA-11-TA. As is best shown in FIG. 2, the filters are in surface-to-surface layer contact and are supported by other structures within the blower, as described above, without the necessity of other supporting grills, frames or clips. Therefore, removal and replacement of the filters is accomplished merely by removing the intake grill 11 and physically grasping and removing filtration mats 22 and 23 from their position within air inlet chamber 26. Replacement filtration mats 22 and 23 are placed in position by extending air outlet 14 through apertures 22A, 23A, respectively, and pressing both filters upwardly into contact with shoulders 18A, 19A or brackets 18, 19 and shoulder 15A of inner housing 15.

I claim:

1. An air purifying and stabilizing blower adapted to be mounted to a ceiling of a room to create a gentle circulation of air within the room to stabilize room temperature and to simultaneously remove particulate matter from the air, said blower comprising:
   (a) an inner housing in which a motor driven impeller is mounted for rotation to create an air flow, said inner housing including an air inlet in the upper portion thereof for admitting air into the portion of the housing surrounding the impeller and air directing vanes affixed to and extending from said inner housing downstream of said impeller to direct air in a flow path extending generally parallel to the axis of rotation of the impeller through an air outlet into the room;
   (b) a relatively large outer housing positioned concentrically around and in spaced-apart relation to said inner housing defining an air intake for directing air into an air intake chamber between inner walls of the outer housing and outer walls of the inner housing, said air intake chamber being in fluid communication with the air inlet in the upper portion of the inner housing to thereby deliver supply air to said impeller; and
   (c) filtration means positioned in said air intake chamber downstream from the air intake and upstream of the air inlet in said inner housing,
whereby air drawn into said inner housing for circulation back into the room is first filtered to remove particulate matter.

2. An air purifying and stabilizing blower according to claim 1, wherein said filtration means comprises an air porous filtration mat formed into a shape having a periphery generally corresponding to the shape defined by the inner walls of said outer housing, said filtration mat having a central aperture, the shape of which generally corresponds to the shape of the outer walls of said inner housing to fit snugly therearound to thereby form a complete filtration barrier upstream of the air inlet of said inner housing.

3. An air purifying and stabilizing blower according to claim 1, wherein said inner and said outer housings are each annular in a cross-section when sectioned perpendicular to the direction of air flow, and wherein the upper portion of said inner housing is of an enlarged diameter to form a shoulder and an area in said air intake chamber of reduced radial dimensions, against which shoulder said filter is supported mechanically and by air flow pressure through said air intake chamber.

4. An air purifying and stabilizing blower according to claim 1, wherein said filtration means comprise first and second air porous filtration mats, each of said first and second mats being formed into a shape having a periphery generally corresponding to the shape defined by the inner walls of said outer housing, said first and second mats having a central aperture, the shape of which generally corresponds to the shape of the outer walls of said inner housing to fit snugly therearound to thereby form a complete filtration barrier upstream of the air inlet of said inner housing, said first filtration mat comprising a relatively air porous prefilter intended to remove particulate matter of relatively large size, and wherein said second filtration mat comprises a relatively less air porous mat to trap particles of a relatively smaller size.

5. An air purifying and stabilizing blower according to claim 4, wherein said second filtration mat comprises a mat of porous activated carbon.

6. An air purifying and stabilizing blower according to claim 4 or 5, wherein said first and second filtration mats are positioned in said air intake chamber in surface-to-surface contact with each other.

7. An air purifying and stabilizing blower according to claim 1, 2, 3, 4, or 5, wherein said blower includes an air intake grill over said air intake including means for attachment to the ceiling whereby said blower may be positioned above a dropped ceiling with the intake grill substantially flush therewith.

* * * * *